United States Patent
Castro da Rosa

(10) Patent No.: US 12,267,365 B2
(45) Date of Patent: Apr. 1, 2025

(54) CONTAINER NETWORK INTERFACE FOR APPLYING SECURITY POLICIES TO NETWORK TRAFFIC OF CONTAINERS

(71) Applicant: Fortinet, Inc., Sunnyvale, CA (US)

(72) Inventor: Sérgio Henrique Marcelino Castro da Rosa, São Paulo (BR)

(73) Assignee: Fortinet, Inc., Sunnyvale, CA (US)

( * ) Notice: Subject to any disclaimer, the term of this patent is extended or adjusted under 35 U.S.C. 154(b) by 626 days.

(21) Appl. No.: 17/490,137

(22) Filed: Sep. 30, 2021

(65) Prior Publication Data

US 2023/0097005 A1    Mar. 30, 2023

(51) Int. Cl.

| | |
|---|---|
| G06F 21/50 | (2013.01) |
| H04L 9/40 | (2022.01) |
| H04L 12/46 | (2006.01) |
| H04L 29/06 | (2006.01) |
| H04L 61/5007 | (2022.01) |
| H04W 76/10 | (2018.01) |
| G06F 21/54 | (2013.01) |
| H04W 84/12 | (2009.01) |
| H04W 88/16 | (2009.01) |

(52) U.S. Cl.
CPC .......... *H04L 63/20* (2013.01); *H04L 12/4641* (2013.01); *H04L 61/5007* (2022.05); *H04L 63/0245* (2013.01); *H04L 63/0263* (2013.01); *H04W 76/10* (2018.02); *H04W 84/12* (2013.01); *H04W 88/16* (2013.01)

(58) Field of Classification Search
CPC . H04L 63/20; H04L 12/4641; H04L 61/5007; H04L 63/0245; H04L 63/0263; H04L 12/12; H04W 76/10; H04W 84/12; H04W 88/16
See application file for complete search history.

(56) References Cited

U.S. PATENT DOCUMENTS

| | | | |
|---|---|---|---|
| 9,560,081 B1* | 1/2017 | Woolward | G06F 9/45558 |
| 2020/0403860 A1* | 12/2020 | Lewis | H04L 41/0806 |
| 2021/0234785 A1* | 7/2021 | Green | G06F 9/45533 |
| 2022/0103593 A1* | 3/2022 | Singh | H04L 63/0245 |
| 2023/0022134 A1* | 1/2023 | Talwar | G06F 9/45558 |

FOREIGN PATENT DOCUMENTS

WO    WO-2020106973 A1 *    5/2020    ............. G06F 21/54

OTHER PUBLICATIONS

Gerald Budigiri; Christoph Baumann; Jan Tobias Mühlberg; Eddy Truyen; Wooter Joosen; "Network Policies in Kubernetes: Performance Evaluation and Security Analysis"; 2021 Joint European Conference on Networks and Communications & 6G Summit (EuCNC/6G Summit); Conference Paper; IEEE; pp. 407-412 (Year: 2021).*

* cited by examiner

*Primary Examiner* — Fatoumata Traore
*Assistant Examiner* — Courtney D Fields
(74) *Attorney, Agent, or Firm* — Law Office of Dorian Cartwright; Dorian Cartwright

(57) ABSTRACT

A specific container is spawned by a docker module responsive to Kebernetes control instruction. Network connectivity is provided for the specific container to a data communication network through a networking bridge and a security policy is configured. After configuration, inbound or outbound data packets concerning the specific container are received and forwarded to a security policy KVM for scanning against security policies. Those that pass security scanning are forwarded to containers and external destinations.

8 Claims, 5 Drawing Sheets

CONTAINER NETWORK INTERFACE FOR APPLYING SECURITY POLICIES TO NETWORK TRAFFIC OF CONTAINERS

FIELD OF THE INVENTION

The invention relates generally to computer networking, and more specifically, for a container network interface for managing network connectivity for a pool of containers on a gateway device coupled to a data communication network, including applying security policies to network traffic of containers.

BACKGROUND

Kubernetes nodes lack security measures against malware. In conventional settings, a container is spawned with the capability of executing an application within. Network connectivity is not native to container architectures.

The traditional Kebernetes node is an orchestrator of containers, with respect to matching application needs with a pool of ready-to-go containers for execution. Conventional CNI (container node interface) is limited to network connectivity issues without concern for any type of network security once connectivity is established.

Therefore, what is needed is a robust technique for managing network connectivity for a pool of containers on a gateway device coupled to a data communication network, including applying security policies to network traffic of containers.

SUMMARY

These shortcomings are addressed by the present disclosure of methods, computer program products, and systems for managing network connectivity for a pool of containers on a gateway device coupled to a data communication network, including applying security policies to network traffic of containers.

In one embodiment of a CNI, a specific container is spawned by a docker module responsive to Kebernetes control instruction. Network connectivity is provided for the specific container to a data communication network through a networking bridge. Providing network connectivity can include creating a network connection between the specific container and the networking bridge, configuring a container security policy with a network security module. IP addresses are assigned from a pool of IP addresses available for the pool of containers and VLANs for the pool of containers.

In another embodiment, after configuration, inbound or outbound data packets concerning the specific container are received and forwarded to the security module for scanning against security policies. Those that pass security scanning are forwarded to containers and external destinations.

Advantageously, secure applications can make use of Kebernetes containers for better operation of computer devices.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for managing network connectivity for a pool of containers on a gateway device coupled to a data communication network, including applying security policies to network traffic of containers. One of ordinary skill in the art will recognize many additional variations made possible by the succinct description of techniques below. For example, Kebernetes is one type of orchestrator for managing containers, and is used here merely for the sake of illustration, not as a limitation.

Figure 2:
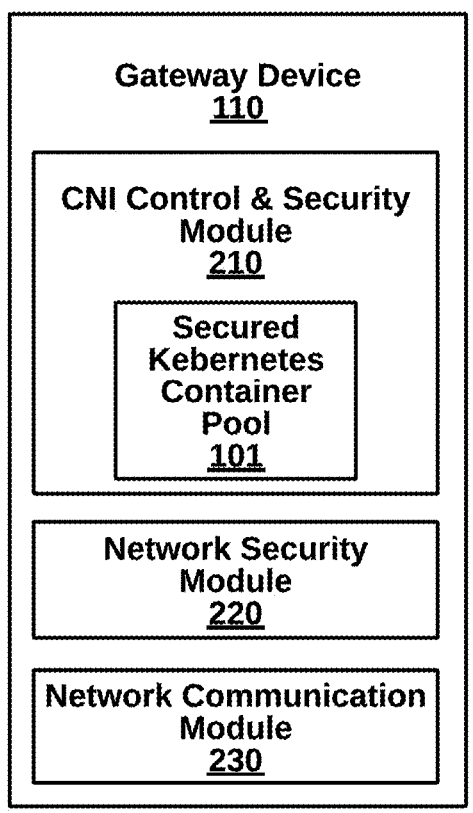
FIG. 2 is a more detailed illustration of a gateway device of the system of FIG. 1, according to an embodiment.
Figure 3:
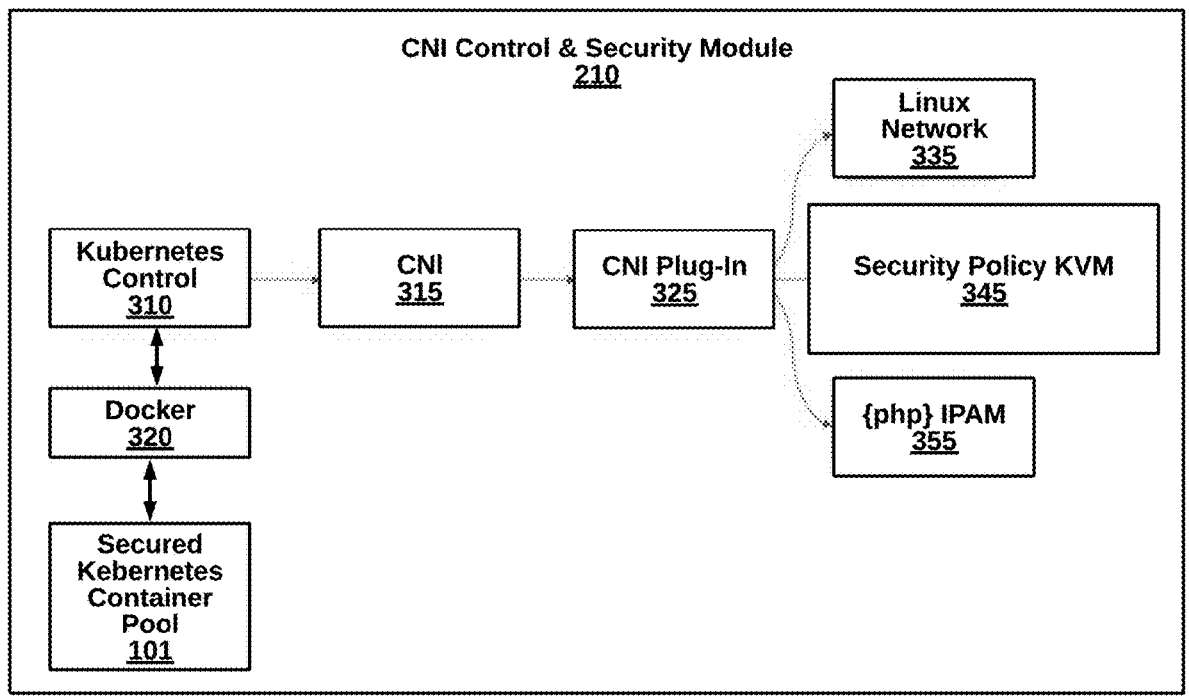
FIG. 3 is a more detailed illustration of an CNI control & security module of FIG. 2, according to some embodiments.

I. Systems for Secure Kubernetes Containers
(FIGS. 1-3)

Figure 1:
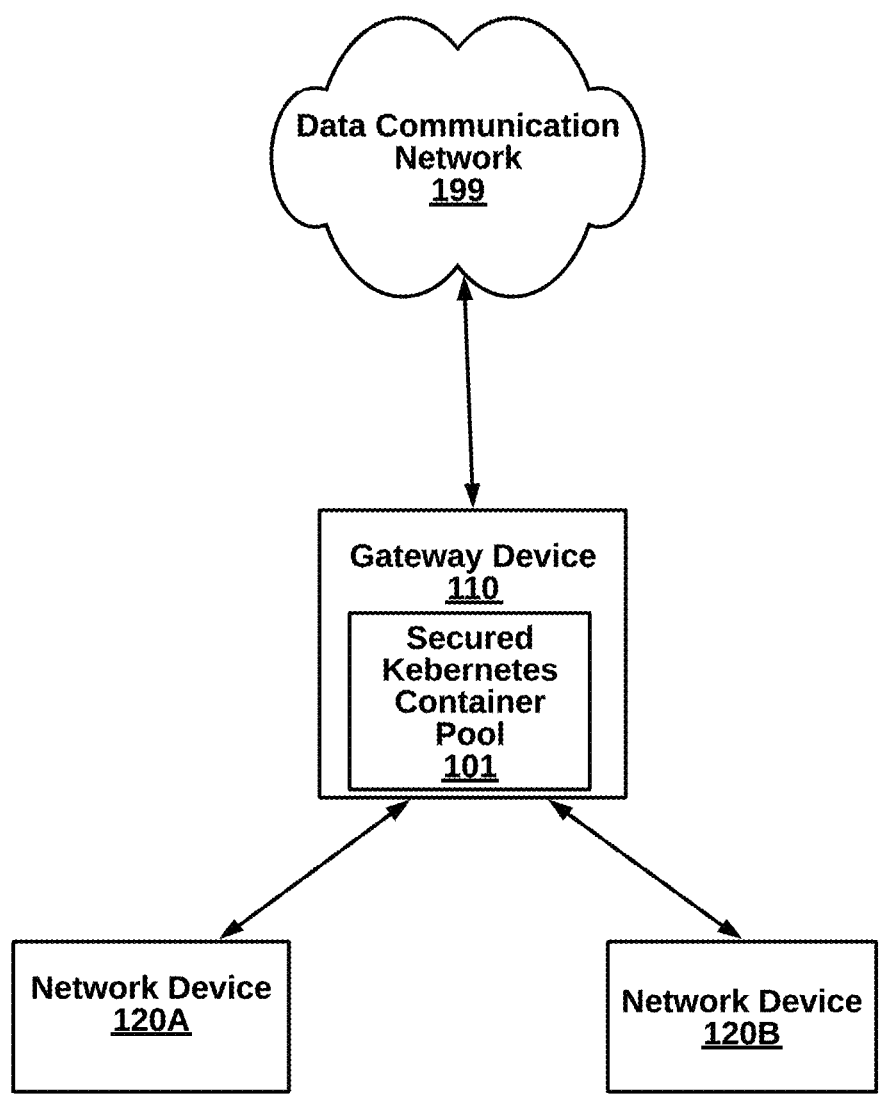
FIG. 1 is a high-level illustration of a system for managing network connectivity for a pool of containers on a gateway device coupled to a data communication network, including applying security policies to network traffic of containers, according to an embodiment.

FIG. 1 is a high-level illustration of a system 100 for managing network connectivity for a pool of secured Kebernetes containers 101 on a gateway device 110 coupled to a data communication network 199, according to an embodiment. The gateway device components can be implemented in hardware, software, or a combination similar to the example of FIG. 6.

The gateway device 110 is coupled in communication to the data communication network 199, preferably, via hard wire. The data communication network 199 can be a data communication network such as the Internet, a WAN, a LAN, WLAN, a cellular network (e.g., 3G, 4G, 5G or 6G), or a hybrid of different types of networks. Various data protocols can dictate format for the data packets. A Wi-Fi network can be configured for various portions of the data communication network 199, such as on a private enterprise network serviced by the gateway device 110, and corresponding Wi-Fi network policies can be implemented on containers. In one embodiment, the private enterprise network connects a data center. In another embodiment, several enterprise networks are remote from each other and containers on remote nodes are connected by a VLAN (virtual local access network). In still another embodiment, aspects of an SD-WAN and link selection are implemented.

The gateway device 110 secures Kebernetes containers communicating over the data communication network 199 (e.g., a first data center node communicating over a VLAN with a second data center node, in one embodiment. A secured Kebernetes container pool 101 is able to safely run applications within individually partitioned environments, including external applications that need to be scanned for malicious components. As a result, more sensitive applications can securely run within containers with similar security policies to process run outside of containers.

In one embodiment, the network device 120A or 120B is an access point serving connected Wi-Fi stations. One of the Wi-Fi stations may cause a specific container to be spawned on the gateway device 110, due to applications running locally at the Wi-Fi station.

A more detailed illustration of the gateway device 110 of the system 100 of FIG. 1 is shown in FIG. 2. The gateway device 110 includes a CNI control & security module 210, a network security module 220, and a network communication module 230. The modules can be implemented in source code stored in non-transitory memory executed by a processor. Alternatively, the modules can be implemented in hardware with microcode. The modules can be singular or representative of functionality spread over multiple components. A hardware implementation of the gateway device 110 can be embodied in the computing device shown in FIG. 6.

The CNI control & security module 210 further comprises a secured Kebernetes container pool 101. The containers can be virtual machines with a single purpose of running a specific application within, and limited to, a virtual environment. The applications can be executed at a data center for remotely connected stations. The applications can be video games or business processes. The CNI control & security module 210, in an embodiment, generates instructions related to configuring a pool of containers including spawning a specific container and provides network connectivity for the specific container to a data communication network. Providing network connectivity includes creating a network connection between the specific container and the networking bridge, configuring a container security policy, and assigning an IP addresses from a pool of IP addresses available for the pool of containers and VLANs for the pool of containers. As a result, containers are secured against malicious network activity.

The network security module 220 can receive inbound or outbound data packets concerning the specific container and scan against security policies. The security policies can be static, learned from history, and/or evolving from artificial intelligence. A policy database can store rules, parameters, thresholds, algorithms, application policies, enterprise network policies, user preferences, network administrator input, and the like. The network security module 220 forwards the inbound or outbound data packets that pass security scanning to the container for inbound traffic and to the network security module 220 for outbound traffic. Security enforcement can include NGFW (next generation firewall), UTM, SD-WAN, and other security techniques and systems.

The communication module 230 connects to physical transmission channels with a transceiver (e.g., Ethernet transceiver or Wi-Fi transceiver) to send data. Additionally, protocol software, antenna, ports, and other components necessary for data transmission.

More details of the CNI control & security module 210 are shown in FIG. 3, which illustrates blocks for a Kebernetes control module 310, a docker 320, a secured Kebernetes container pool 330, a CNI module 315 and a CNI plug-in 325. The Kebernetes control module 310 is an orchestrator for containers, ensuring that containers remain healthy and running. Errors can be reported via CLI and error logs.

The docker 320 spawns and secures new containers to a pool of secured containers 330 upon demand by the Kebernetes control module 310. The containers can be virtual machines with a single purpose of running a specific application within, and limited to, a virtual environment. Once a session with an application is complete, containers can be deleted and its resources returned for use by new containers. The CNI module 315 and CNI plug-in 325 configure network connectivity and security for the pool of containers 125. After deployment, the docker 320 is able to interconnect with security policies. In particular, the docker 320 and KVM use a network bridge from kernel to flow the network packets inside and/or outside the compute node, at layer 2. The packet inside a container that needs to reach another internal subnet or the Internet with use the Linux network 335 for application of security rules, anti-virus, web filters and the like.

Figure 4:
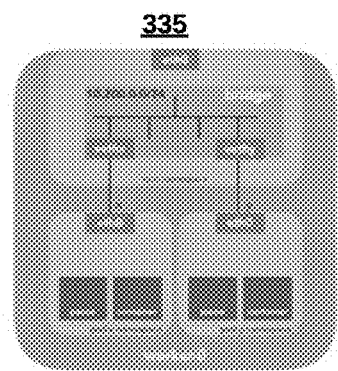
FIG. 4 is a block diagram illustrating a Linux network of FIG. 5, according to an embodiment.

In more detail, the CNI module 315 interfaces with Kubernetes control 310 to gather parameters for containers. The parameters are passed to the CNI plug-in 325 to interface with a Linux network 335, a security policy KVM 345, and an IPAM module 355. An implementation of the Linux network 335 is shown in FIG. 4 and is created with network resources including a namespace interface, a veth interface, a bridge association, and a VLAN/trunk. Next, the security policy KVM 345 is created with network resources including a VLAN, an IP address gateway, wherein the VLAN is added into a previous zone that belongs to a firewall policy BGP network announced.

The IPAM module 355 reserves and manages IP resources to avoid duplicate IP or IP exhaustion. In conjunction with the CNI module 315, the IPAM module 355 can manage and create VLANs, IPs and subnets in a Linux server automatically. In SD-branch, a branch can now directly connect the branch with application via IPSec tunnel.

In another embodiment, the CNI plug-in 325 is integrated with the CNI module 325 as a single component.

II. Methods for Secure Kubernetes Containers
(FIG. 5)

Figure 5:
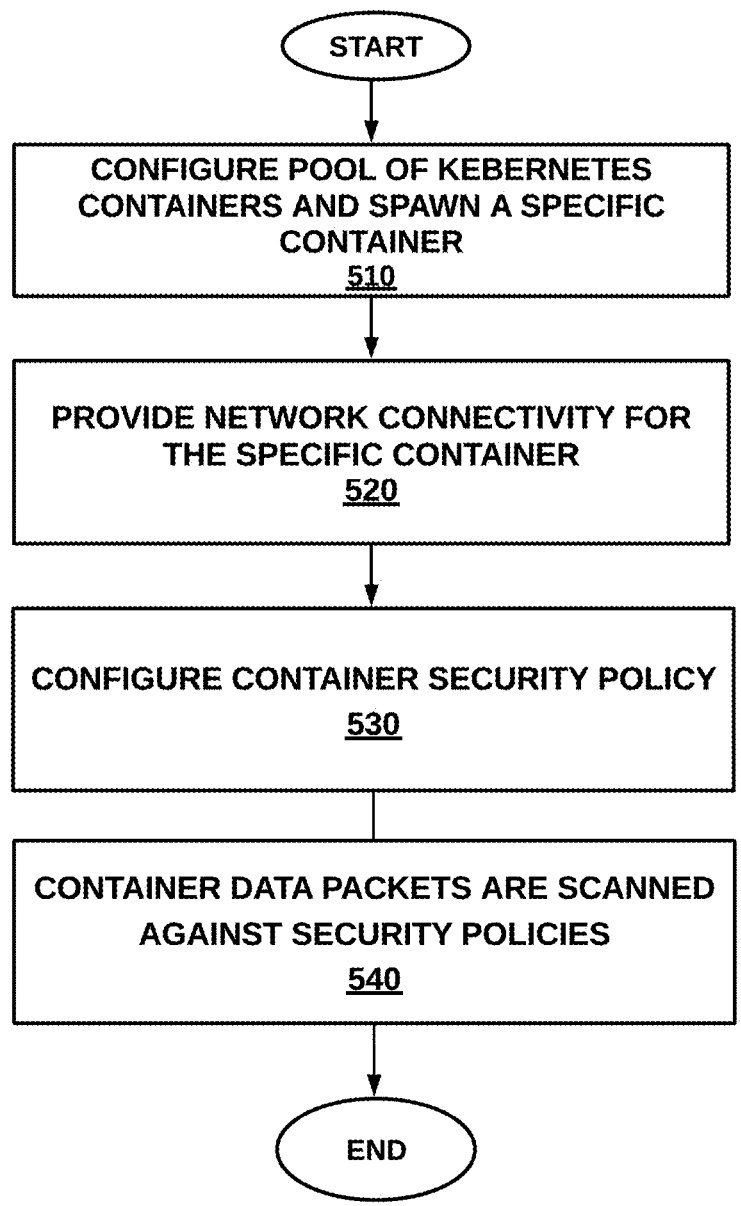
FIG. 5 is a more detailed flow diagram illustrating the step of automatically configuring link aggregation of incompatible data ports for the method of FIG. 4, according to one embodiment.

FIG. 5 is a high-level flow diagram illustrating a method for managing network connectivity for a pool of containers on a gateway device coupled to a data communication network, including applying security policies to network traffic of containers, according to one embodiment. The method 500 can be implemented, for example, by the system 100 of FIG. 1. The steps are merely representative groupings of functionality, as there can be more or fewer steps, and the steps can be performed in different orders. Many other variations of the method 500 are possible.

At step 510 instructions are received for configuring a pool of containers, including an instruction for spawning a specific container with a docker module.

At step 520, network connectivity is provided for the specific container to a data communication network through a networking bridge. Providing network connectivity includes creating a network connection between the specific container and the networking bridge, and assigning an IP addresses from a pool of IP addresses available for the pool of containers and VLANs for the pool of containers.

At step 530, a container security policy is configured with a network security module. An NGFW can be set up specifically for a container with a network policy for malware scanning.

At step 540, inbound or outbound data packets concerning the specific container are received and forwarded to the security module for scanning against security policies. The inbound or outbound data packets that pass security scanning are forwarded.

III. Generic Computing Device (FIG. 6)

Figure 6:
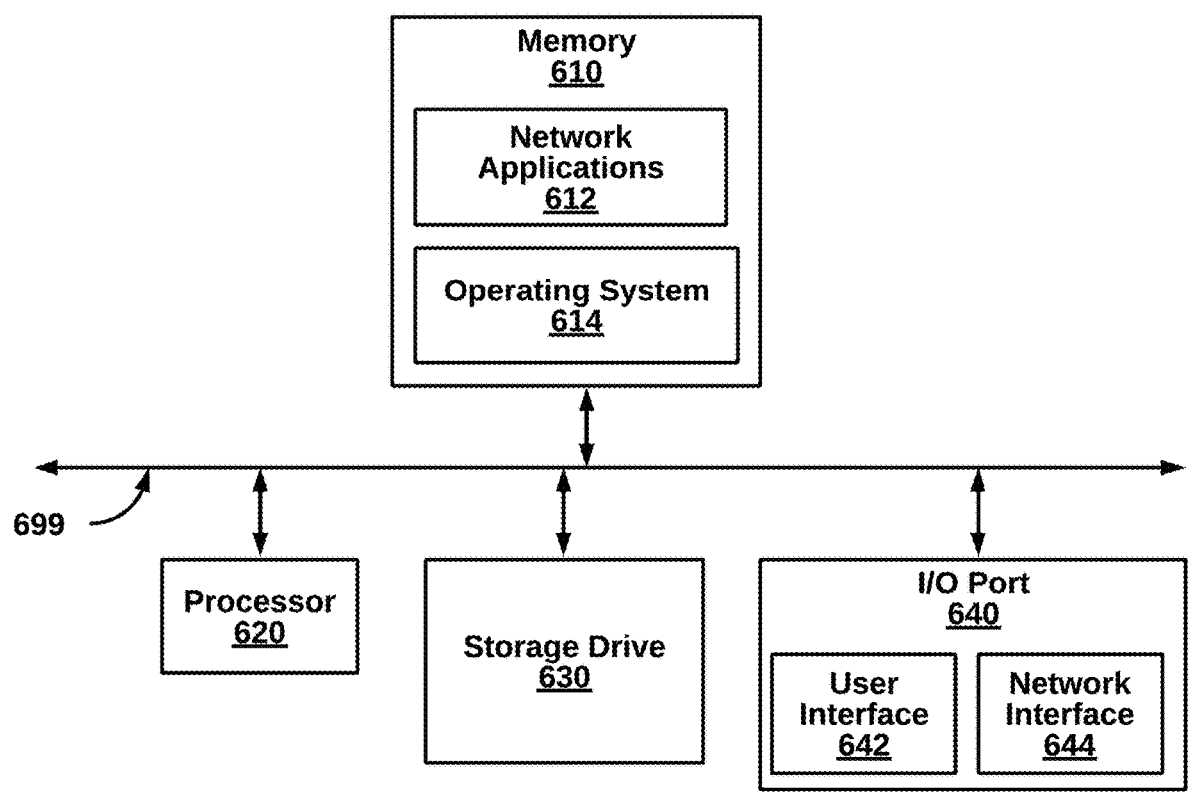
FIG. 6 is an example of a computing environment for implementing the system of FIG. 1, according to an embodiment.

FIG. 6 is a block diagram illustrating an example computing device 600 for use in the system 100 of FIG. 1, according to one embodiment. The computing device 600 is implementable for each of the components of the system 100 (e.g., the gateway device 110, and the network devices 120A and 120B). The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog and use any suitable protocol.

The memory 610 further comprises network applications 612 and an operating system 614. The network applications 612 can include a web browser, a mobile application, an application that uses networking, a remote application executing locally, a network protocol application, a network management application, a network routing application, or the like. For example, the CNI control & security module can be a network application communicating with the operating system 614 and the processor 620.

The operating system 614 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The processor 620 can be a network processor (e.g., optimized for IEEE 802.11, IEEE 802.11AC or IEEE 802.11AX), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630.

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g., an RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A container network interface managing network connectivity for a pool of containers on a gateway device coupled to a data communication network, including applying security policies to network traffic of containers, the gateway device comprising:
   a processor;
   a network interface communicatively coupled to the processor and to the enterprise network and to the Wi-Fi network; and
   a memory, storing:
      a Kubernetes configuration module to receive instructions related to configuring a pool of containers including spawning a specific container, and providing network connectivity for the specific container to a data communication network through a networking bridge,
      wherein providing network connectivity includes creating a specific network connection between the specific container and the networking bridge, gathering network parameters for the specific container, configuring a container security policy with a network security module, and assigning an IP (Internet Protocol) address from a pool of IP addresses available for the pool of containers and VLANs for the pool of containers; and
      a container traffic control module to receive inbound or outbound data packets concerning the specific container and forward to the security module for scanning against security policies, wherein the inbound or outbound data packets are sent over the network bridge from a kernel at layer 2,
      wherein the container traffic control module forwards the inbound or outbound data packets that pass security scanning.

2. The gateway device of claim 1, wherein the network security module comprises at least one of a firewall, a NGFW (next generation firewall), a UTM (unified threat management) module, and a DPI (deep packet inspection) module.

3. The gateway device of claim 1, wherein the Kubernetes module provides the network bridge by generating a namespace within Linux and connecting a eth for internal networking to a veth for external networking, wherein the veth (virtual Ethernet) interfaces with a networking transceiver.

4. The gateway device of claim 1, wherein the first module manages the assignment of the IP addresses with IPAM (IP address management).

5. The gateway device of claim 1, wherein the network security module applies a rule for implementing a security policy concerning at least one of layer 7 security and secure HTTP.

6. The gateway device of claim 1, wherein the container network interface operates within an SD-WAN.

7. A computer-implemented method in a gateway device for managing network connectivity for a pool of containers on a gateway device coupled to a data communication network, including applying security policies to network traffic of containers, the method comprising the steps of:
   spawning, with a docker module, a specific container in a pool of containers, wherein each container executes contents in isolation;
   providing network connectivity for the specific container to a data communication network through a networking bridge,
   wherein providing network connectivity includes creating a specific network connection between the specific container and the networking bridge, gathering network parameters for the specific container, configuring a container security policy with a network security module, and assigning an IP (Internet Protocol) address from a pool of IP addresses available for the pool of containers and VLANs for the pool of containers; and
   receiving inbound or outbound data packets concerning the specific container and forward to the security module for scanning against security policies, wherein the inbound or outbound data packets are sent over the network bridge from a kernel at layer 2,
   wherein the container traffic control module forwards the inbound or outbound data packets that pass security scanning.

8. A non-transitory computer-readable media in a gateway device, when executed by a processor, for managing network connectivity for a pool of containers on a gateway device coupled to a data communication network, including applying security policies to network traffic of containers, the method comprising the steps of:
   spawning, with a docker module, a specific container in a pool of containers, wherein each container executes contents in isolation;
   providing network connectivity for the specific container to a data communication network through a networking bridge,
   wherein providing network connectivity includes creating a specific network connection between the specific container and the networking bridge, gathering network parameters for the specific container, configuring a container security policy with a network security module, and assigning an IP (Internet Protocol) address from a pool of IP addresses available for the pool of containers and VLANs for the pool of containers; and
   receiving inbound or outbound data packets concerning the specific container and forward to the security module for scanning against security policies, wherein the inbound or outbound data packets are sent over the network bridge from a kernel at layer 2,
   wherein the container traffic control module forwards the inbound or outbound data packets that pass security scanning.

* * * * *